(12) United States Patent
Kijima et al.

(10) Patent No.: US 6,661,451 B1
(45) Date of Patent: *Dec. 9, 2003

(54) IMAGE PICKUP APPARATUS CAPABLE OF PERFORMING BOTH A STILL IMAGE PROCESS AND A DYNAMIC IMAGE PROCESS

(75) Inventors: Takayuki Kijima, Akiruno (JP); Hiroyuki Watanabe, Yokohama (JP); Junzo Sakurai, Koganei (JP); Dai Kawase, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/961,408

(22) Filed: Oct. 30, 1997

(30) Foreign Application Priority Data

Nov. 1, 1996  (JP) ............................................... 8-291752

(51) Int. Cl.$^7$ .......................... H04N 5/225; H04N 5/335
(52) U.S. Cl. ...................... 348/220.1; 348/322; 348/294
(58) Field of Search ................................ 348/220, 222, 348/207, 229, 272, 273, 279, 294, 311, 312, 315, 317, 319, 322, 324, 362, 333.09, 333.11, 446, 441, 220.1, 222.1, 207.99, 229.1; 358/906, 909.1

(56) References Cited

U.S. PATENT DOCUMENTS

| | | | |
|---|---|---|---|
| 4,591,900 A | | 5/1986 | Heeb et al. |
| 4,630,105 A | | 12/1986 | Knop |
| 4,740,828 A | | 4/1988 | Kinoshita |
| 4,779,137 A | * | 10/1988 | Tojo et al. ................... 348/229 |
| 4,831,453 A | * | 5/1989 | Takemura ................... 348/322 |
| 5,239,380 A | * | 8/1993 | Yokoyama ................... 348/322 |
| 5,287,192 A | * | 2/1994 | Iizuka ......................... 348/311 |
| 5,489,945 A | | 2/1996 | Kannegundia et al. |
| 5,512,945 A | * | 4/1996 | Sakurai et al. ............... 348/221 |
| 5,528,291 A | * | 6/1996 | Oda ............................. 348/220 |
| 5,668,597 A | * | 9/1997 | Parulski et al. ............. 348/315 |
| 5,751,348 A | * | 5/1998 | Inuiya et al. ............... 348/220 |
| 5,828,406 A | * | 10/1998 | Parulski et al. ............. 348/220 |
| 5,926,215 A | * | 7/1999 | Whipple et al. ............. 348/322 |
| 5,990,952 A | * | 11/1999 | Hamasaki ..................... 348/311 |
| 6,084,634 A | * | 7/2000 | Inagaki et al. .............. 348/294 |
| 6,342,921 B1 | * | 1/2002 | Yamaguchi et al. ........ 348/322 |
| 6,538,696 B2 | * | 3/2003 | Hieda et al. ................. 348/317 |

FOREIGN PATENT DOCUMENTS

| | | |
|---|---|---|
| EP | 0 571 908 A2 | 12/1993 |
| EP | 0 720 387 A2 | 7/1996 |
| JP | 6-113191 | 4/1994 |
| JP | 6-113209 | 4/1994 |
| JP | 7-75114 | 3/1995 |
| JP | 7-240871 | 9/1995 |

* cited by examiner

*Primary Examiner*—Aung S. Moe
(74) *Attorney, Agent, or Firm*—Frishauf, Holtz, Goodman & Chick, P.C.

(57) ABSTRACT

An imaging apparatus includes an interline type CCD image sensor having 1,000,000 or more pixels, which has a Bayer configuration color filter suitable for reading all pixel signals in a line-sequential scanning manner. The imaging apparatus drives the CCD image sensor in a high speed mode usually, and in a high quality image mode only for a trigger depression. In the high speed mode, the CCD image sensor outputs pixel signals for one line at intervals of three lines in the vertical direction. During the high speed mode operation of the CCD image sensor, images are displayed on a liquid crystal display portion at a frame rate of 60 frames/second, the images being recognized by the human eyes as a dynamic image, i.e., a motion picture.

7 Claims, 13 Drawing Sheets

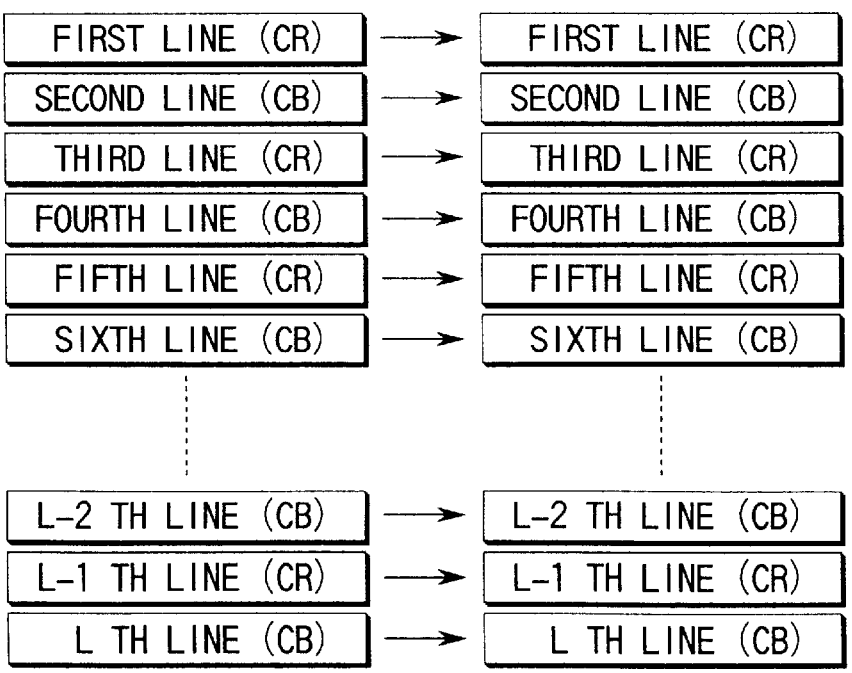

IMAGE PICKUP APPARATUS CAPABLE OF PERFORMING BOTH A STILL IMAGE PROCESS AND A DYNAMIC IMAGE PROCESS

BACKGROUND OF THE INVENTION

The present invention relates to an electronic imaging apparatus having a CCD image sensor, that is, a so-called electronic still camera.

Recently, research and development of electronic imaging apparatuses capable of inputting image data to multimedia equipment, so-called electronic still cameras have energetically been performed. In general, the electronic still camera obtains an image by using a CCD image sensor to display the obtained image on an electronic view finder, such as a liquid crystal panel, and to record the image on a recording medium by, for example, a magnetic means in accordance with depression of the trigger performed by a user.

Although the electronic still camera is a very easy device to use because no development of film is required, further improvement in the image quality and case of have been required of the electronic still camera. To satisfy the foregoing requirements, an image having the same angle of views which is the same as that of the image which must be photographed is required to be observed in real time through an electronic view finder, and a CCD image sensor having a large number of pixels must be used.

CCD image sensors having the number of effective pixels, which is larger than 1,000,000, have been realized. It is considered that CCD image sensors having larger pixels will be put into practical use. CCD image sensors arranged to photograph a still image and adapted to sequential scanning for sequentially, reading image signals for each line have been used in place of the conventional interlaced scanning. The reason for this lies in that prevention of deterioration in the image quality attributable to the difference in time required to read pixel signals from adjacent lines has been attempted.

The main stream of the operation clock frequencies of marketed A/D converters is about 15 MHz to about 20 MHz. When also reduction in the electric power consumption is attempted, higher drive frequencies are detrimental to the improvement. Frame rates of about 10 to 15 frames/second can be realized by the sequential scanning operation of CCD image sensors of 1,000,000-pixel class.

With the above-mentioned degree of the frame rate, the displayed image is recognized by the human eyes as a pseudo dynamic image (or motion picture) realized by frame advance in place of being recognized as a natural image. To display an image as a natural image for the human eyes, a frame rate of 30 to 60 frames/second is required.

BRIEF SUMMARY OF THE INVENTION

An object of the present invention is to provide an electronic imaging apparatus having a large number of pixels, for example, 1,000,000 pixels, and which is capable of displaying an image which is recognized as a dynamic image in a non-photographing mode even with a relatively low operation frequency, for example, 20 MHz or lower.

Additional objects and advantages of the invention will be set forth in the description which follows, and in part will be obvious from the description, or may be learned by practice of the invention. The objects and advantages of the invention may be realized and obtained particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows the structure of a Bayer configuration color filter.

FIG. 3 shows a state where pixel signals are read in a high quality image mode.

DETAILED DESCRIPTION OF THE INVENTION

Figure 1:
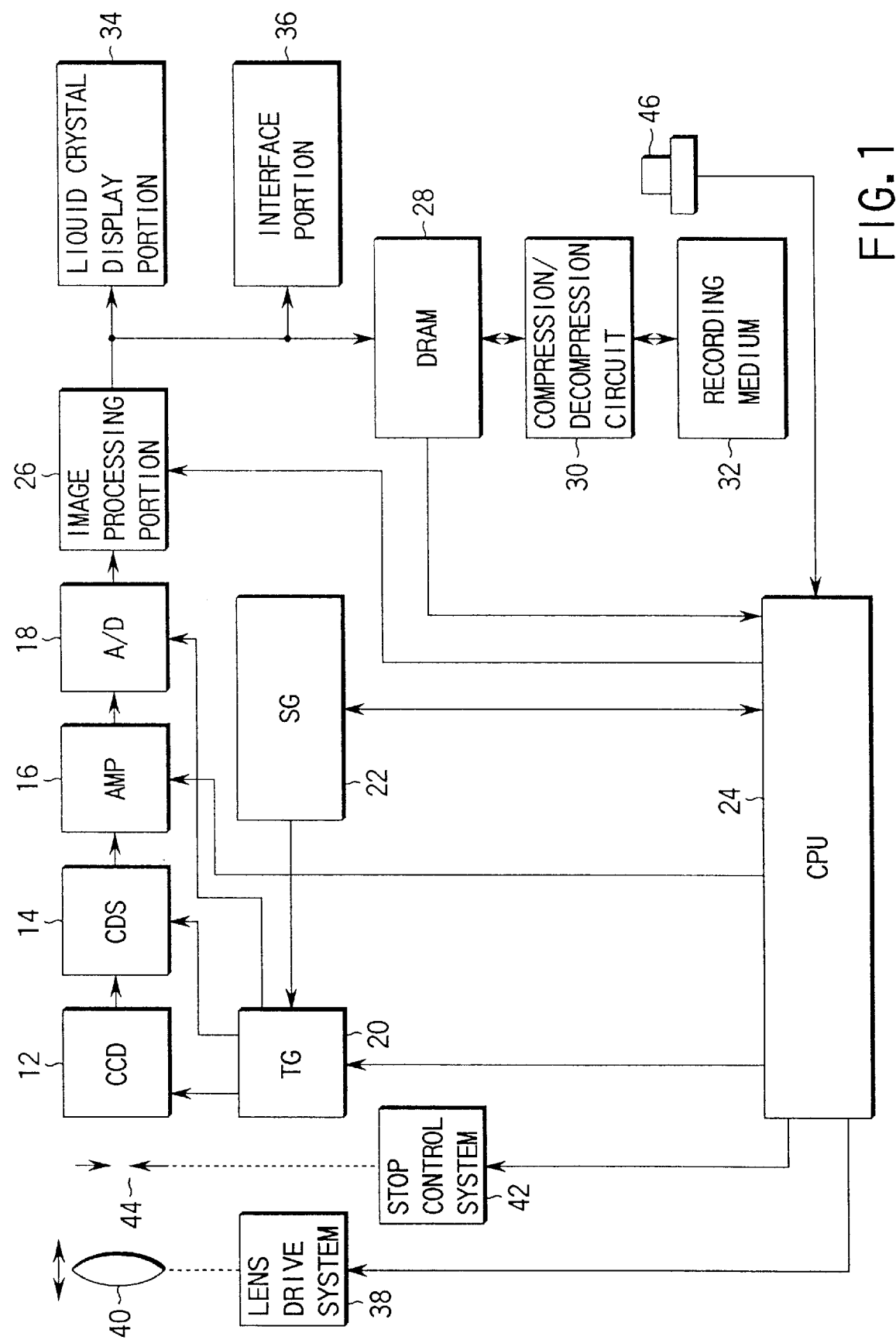
FIG. 1 is a block diagram showing the structure of a circuit in an electronic imaging apparatus according to an embodiment of the present invention.

Referring to the drawings, an embodiment of the present invention will now be described.

FIG. 1 is a block diagram showing the structure in a circuit in an electronic imaging apparatus according to an embodiment of the present invention. The electronic imaging apparatus has a CCD image sensor 12, a correlation double sampling circuit (CDS) 14, a gain control amplifier (AMP) 16 and an analog-to-digital converter 18. The CCD image sensor 12 is operated in response to a transfer pulse supplied from a timing generator 20. The correlation double sampling circuit (CDS) 14 is operated in response to a sample holding pulse supplied from the timing generator 20. The timing generator 20 is operated in synchronization with a signal generator 22 in accordance with a synchronizing signal generated by the signal generator 22.

An image processing portion 26 processes pixel signals supplied from the A/D converter 18 to form an image. A DRAM 28 temporarily stores image data supplied from the image processing portion 26, while a compressing/decompression circuit 30 compresses image data stored in the DRAM 28. A recording medium 32 is used to record compressed image data supplied from the compressing/ decompression circuit 30. The compressing/ decompression circuit 30 decompresses compressed image data recorded on the recording medium 32, while the DRAM 28 is used to temporarily store decompressed image data supplied from the compressing/decompression circuit 30.

An interface portion 36 is a terminal which enables data communication with an external unit, such as a monitor, a personal computer or the like. Thus, output of image data supplied from the image processing portion 26 or the DRAM 28 to the external unit is enabled or, in some cases, image data to be captured from the external unit.

A liquid crystal display portion 34 displays an image on the basis of the image data supplied from the image processing portion 26 or the decompressed image data supplied from the DRAM 28.

A CPU 24 controls the timing generator 20, the signal generator 22, a lens drive system 38 and a stop control system 42. Specifically, the CPU 24 follows an instruction to capture a still image issued from a trigger 46 to switch the operation mode of the CCD image sensor 12 and performs automatic focus control to drive a lens 40 in accordance with the image data supplied from the DRAM 28, control to change the aperture of a stop 44 and control of the quality of exposure of the CCD image sensor 12.

The CCD image sensor 12 is an inter-line type image sensor having 1,000,000 or more pixels and comprising a Bayer configuration color filter suitable for reading all pixels by line-sequential scanning. In this specification, "reading all pixels by line-sequential scanning" means sequential reading of data of pixels included in each line in the ascending line order as a first line, a second line and a third line to read all pixel signals as a result of one scanning operation.

The structure of the Bayer configuration color filter is shown in FIG. 2. Referring to FIG. 2, symbols R, G and B represent filter elements respectively permitting red, green and blue light to pass through. Each of the filter elements is disposed in front of one of photodiodes of the CCD image sensor 12. The foregoing Bayer configuration color filter is structured in such a manner that R (red) and G (green) filter elements are alternately disposed on the odd-numbered lines, while G (green) and B (blue) filter elements are alternately disposed on the even-numbered lines. Moreover, G (green) filter elements are disposed to form a checkered pattern as a whole.

The CCD image sensor 12 is operated in either of a high quality image mode or a high speed mode. Switching of the operation mode is performed by the timing generator 20 in such a manner that the timing generator 20 changes the transfer pulse to be output to the CCD image sensor 12. The high quality image mode is an operation mode in which all of the pixel signals obtained by the CCD image sensor 12 are read by the line-sequential scanning manner and with which a fine image can be obtained. However, time of $\frac{1}{15}$ second to $\frac{1}{10}$ second is required to read one image. On the other hand, the high speed mode is an operation mode arranged in such a manner that the number of horizontal transferring operations is reduced. The high speed mode is an operation mode in which pixel signals obtained by the CCD image sensor 12 are selectively read or added, and then read. Although the obtainable image quality is inferior to that obtainable from the high quality image mode, one image can be read in $\frac{1}{60}$ second to $\frac{1}{30}$ second. Therefore, an image can be obtained at a frame rate of 30 to 60 frames/second with which adaptation to a usual display of a dynamic image or motion picture is permitted.

Figure 12:
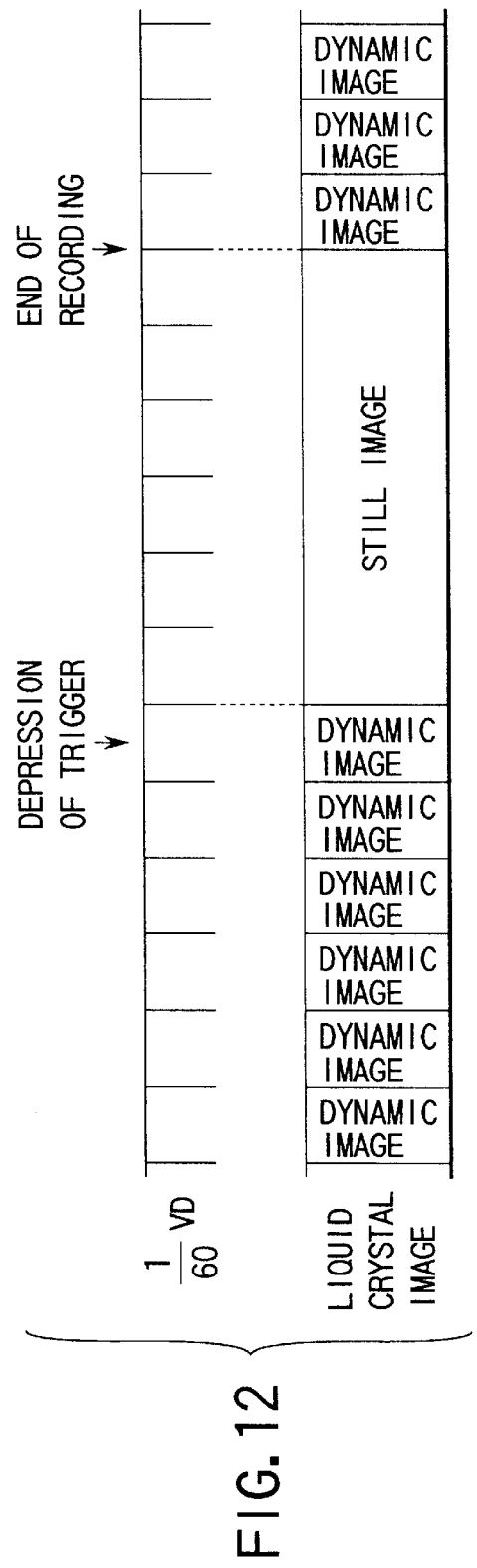
FIG. 12 shows switch of images displayed on a liquid crystal display portion.
Figure 13:
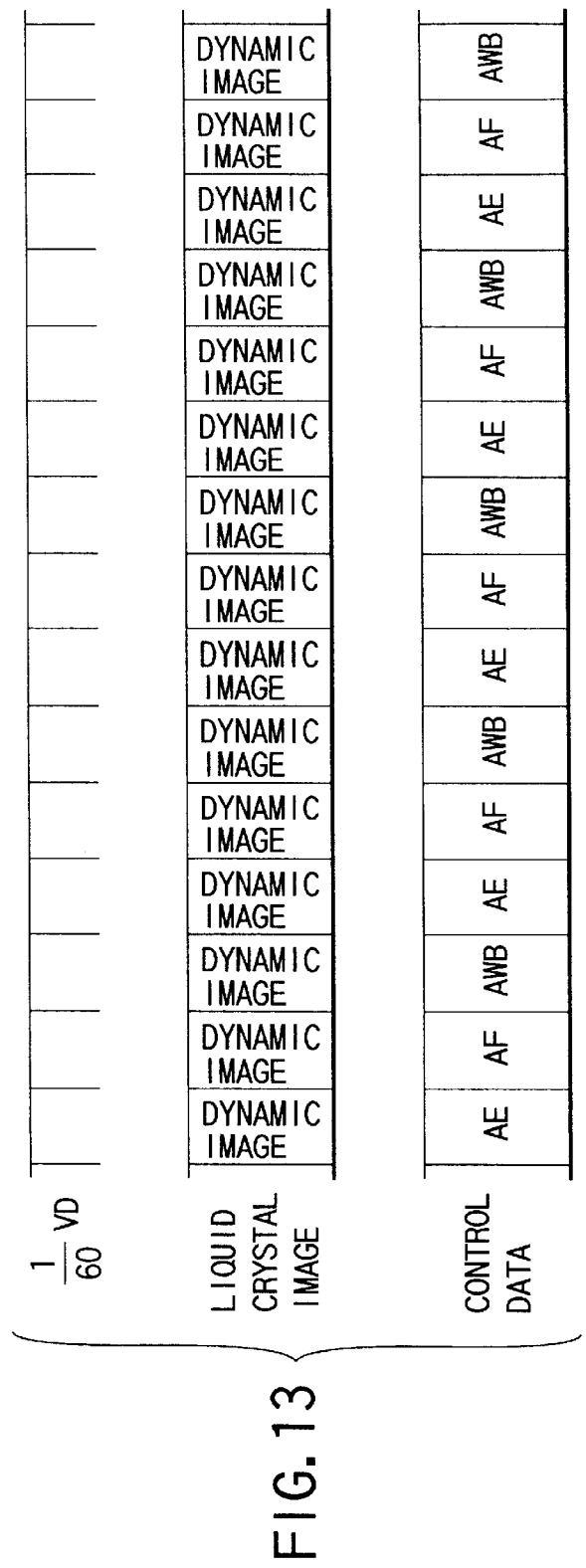
FIG. 13 shows a state where control data for AF, AWB and AE is sequentially obtained for each frame.

In a usual state, that is, when no photographing operation is performed, the CCD image sensor 12 is operated in the high speed mode. Only when the trigger 46 has been depressed, that is, only when a photographing operation is performed, the CCD image sensor 12 is operated in the high quality image mode. During a period in which the CCD image sensor 12 is operated at the high speed mode, images are displayed on the liquid crystal display portion 34 at a frame rate of 30 to 60 frames/second, the images in the foregoing state being recognized as dynamic images. The fine image obtained in the high quality image mode is recorded on the recording medium 32. After the operation for recording the still image has been ended, the reading mode for the CCD image sensor 12 is returned to the high speed mode. The foregoing operation will be described with reference to FIG. 12.

Note that the electronic imaging apparatus may have a structure that the CCD image sensor 12 is operated in the high quality image mode also when the trigger 46 has been depressed. In the foregoing case, the image displayed on the liquid crystal display portion 34 is always recognized for the eyes of a human being as a dynamic image.

FIG. 3 illustrates a state where a pixel signal is read in the high quality image mode. In FIG. 3, the left-hand columns indicate pixel signals on respective lines obtained by the CCD image sensor 12, while the right-hand columns indicate pixel signals which are actually read. A consideration is made that odd-numbered lines include color data about red (R) in accordance with the correspondence to the color filter shown in FIG. 2, the odd-numbered lines are expressed as CR. On the other hand even-numbered lines are expressed as CB because the even-numbered lines include color data about blue (B).

In the high quality image mode the CCD image sensor 12 sequentially outputs pixel signals for each line. That is, pixel signals for a first line are output. After output of pixel signals for the first line has been ended, pixel signals for a second line are output. After output of the pixel signals for the second line has been ended, pixel signals for a third line are output. Then, the same process is repeated, and finally pixel signals for an L th line are output.

The line-sequential scanning operation, arranged to alternately read lines (CR) including information indicating red and lines (CB) including information indicating blue, enables a high resolution image to be obtained. Since pixel signals for the adjacent lines are exposed for the same time, a high quality image can be obtained. However, time of $\frac{1}{15}$ to $\frac{1}{10}$ second is required to read all of the pixel signals.

A variety of reading manners may be employed for the high speed mode. Specifically, a variety of manners may be considered by changing the manner of selecting lines from which pixel signals are read and the manner of processing the selected lines. A representative portions of variety of modes adaptable to the electronic imaging apparatus will now be described.

Figure 4:
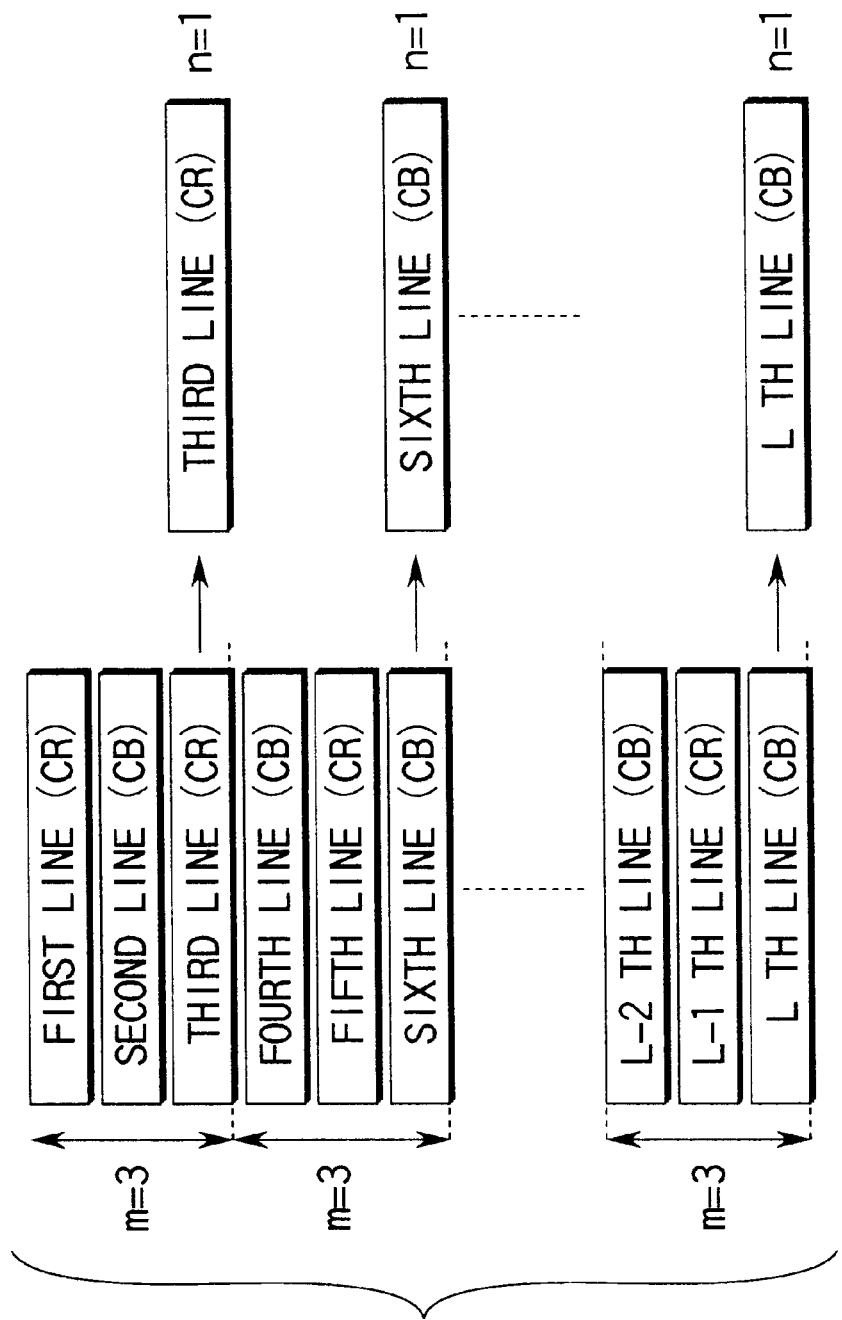
FIG. 4 shows a state where pixel signals are read in a first high speed mode.

FIG. 4 illustrates a state where pixel signals are read in a first high speed mode. In FIG. 4, the left-hand column indicate pixel signals obtained by the CCD image sensor 12 for line units, while the right-hand column indicate, for line units, pixel signals which are actually read. Similarly to FIG. 3, lines including color data about red (R) are expressed as CR and lines including color data about blue (B) are expressed as CB.

As shown in FIG. 4, the foregoing high speed mode is arranged in such a manner that the CCD image sensor 12 sequentially outputs pixel signals for every three lines, that is, outputs pixel signals at intervals of three lines in the vertical direction. That is, pixel signals of a third line are initially output. After output of the pixel signals of the third line has been ended, pixel signals of a sixth line are output. After output of pixel signals of a sixth line has been ended, pixel signals of a ninth line are output. Then, the same process is repeated. Finally, pixel signals of an L th line are output. Although FIG. 4 shows that pixel signals of the L th line are output finally, that is, L is a multiple of 3 for convenience, there is no inevitability that L is a multiple of 3.

In the CCD image sensor, time required to perform the horizontal transfer generally contributes to time required to read pixel signals. That is, the number of horizontal transfer operations determines time required to read pixel signals.

In the high'speed mode shown in FIG. 4, the number of lines, from which pixel signals are actually read, is one-third of the overall lines. Therefore, the number of the horizontal transfer operations is one-third of the number required for the high quality image mode. Thus, pixel signals are substantially read in one-third time. That is, pixel signals for one image can be read in 1/45 to 1/30 second. Therefore, an image can be obtained at a frame rate of 30 to 45 frames/second. The foregoing frame rate is a value with which a usual display of a dynamic image can be realized.

Since pixel signals for every three lines are read in the high speed mode shown in FIG. 4 with respect to the color filter having the Bayer configuration, that is, since pixel signals for one line are read at intervals of three lines in the vertical direction, read pixel signals, that is lines (CR) including red color information and lines (CB) including blue color information are alternately disposed in the vertical direction on the right-hand columns shown in FIG. 4. Therefore, a high resolution image can be obtained.

The configuration in which lines (CR) including red color information in the read pixel signal and lines (CB) including blue color information of the same are alternately positioned in the vertical direction is, in this specification, called "color line-sequential". Moreover, alternate reading of lines (CR) including red information and lines (CB) including blue information is called "color line-sequential scanning".

In the high speed mode shown in FIG. 4, pixel signals for one line are read at intervals of three lines in the vertical direction. The number of lines is not limited to the foregoing number of lines. For example one line at intervals of five lines in the vertical direction may be read. As an alternative to this, pixel signals for one or three lines may be read at intervals of seven lines.

Also in the case where pixel signals for one line are read at the intervals of three lines in the vertical direction, the line to be read is not limited to the third line. The line to be read may be a first line or a second line.

In view of the foregoing, the first high speed mode described with reference to FIG. 4 is a mode in which pixel signals for n lines are read at intervals of m lines in the vertical direction (where m and n are natural numbers satisfying m>n). Specifically, the mode is a mode in which pixel signals for $(2\beta-1)$ lines are read at intervals of $(2\alpha-1)$ lines in the vertical direction (where $\alpha$ and $\beta$ are natural numbers satisfying $\alpha>\beta$).

In other words, the lines of the CCD image sensor are divided into a plurality of blocks in the vertical direction, each of the blocks including m lines, and the pixel signals for n lines are read from the each block. Specifically, the pixel signals for the $(2\beta-1)$ lines are read from the each block consisting of the $(2\alpha-1)$ lines.

In this case, time required to read pixel signals is substantially n/m of time required to read pixel signals in the high quality image mode, that is, $(2\beta-1)/(2\alpha-1)$. Pixel signals are read by the color line-sequential manner to the Bayer configuration color filter.

Figure 5:
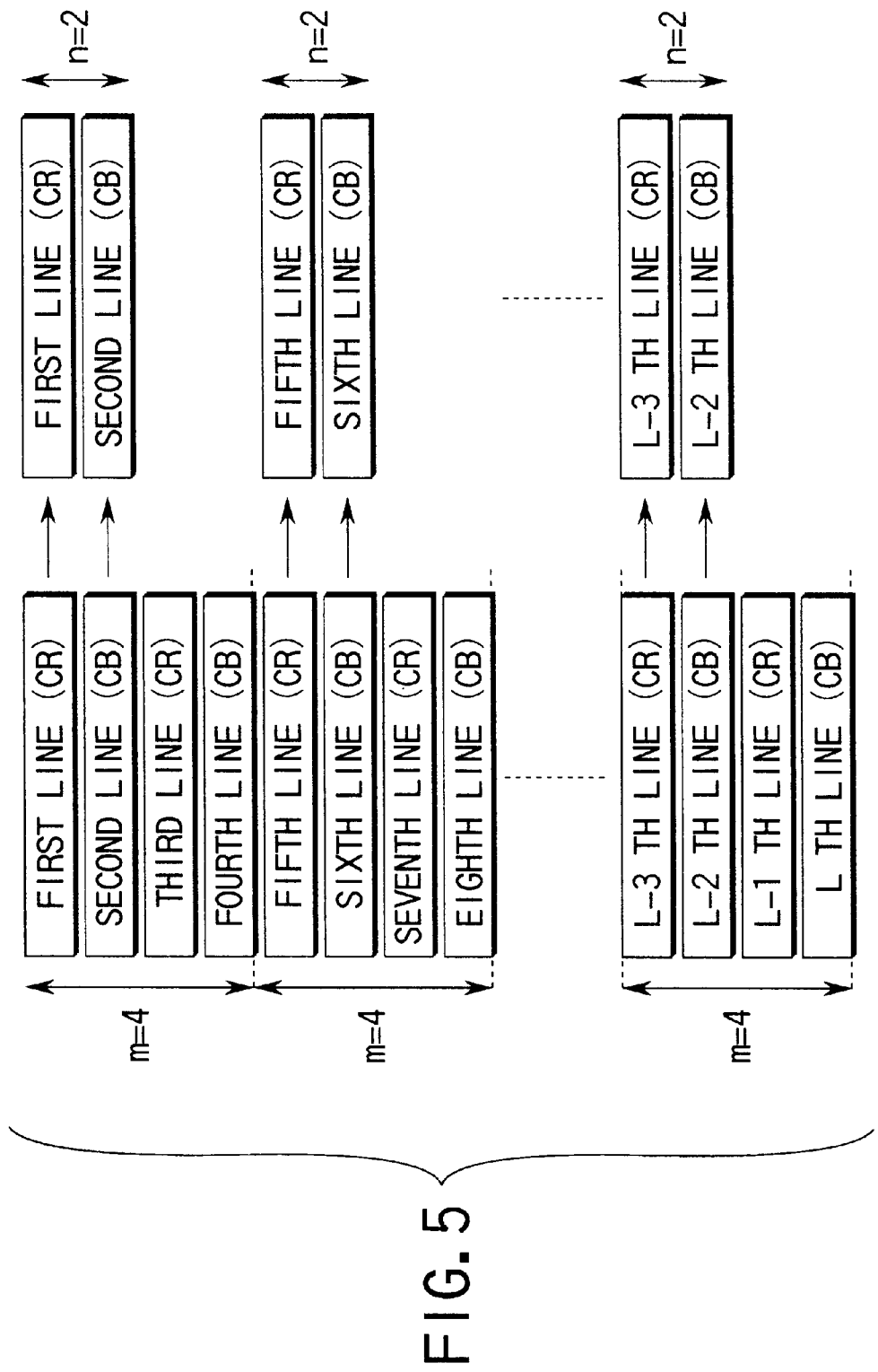
FIG. 5 shows a state where pixel signals are read in a second high speed mode.

FIG. 5 illustrates a state where pixel signals are read by a second high speed mode. The meanings and expressions of CR and CB are the same as those shown in FIG. 4.

As shown in FIG. 5, the foregoing high speed mode is arranged in such a manner that the CCD image sensor 12 sequentially outputs pixel signals for two lines at intervals of three lines. That is, it outputs pixel signals for two lines at intervals of four lines in the vertical direction. That is, pixel signals for a first line are initially output. After output of the pixel signals for the first line has been ended, pixel signals for a second line is output. After output of the pixel signals for the second line has been ended, pixel signals for a fifth line are output. After output of the pixel signals for the fifth line has been ended, pixel signals for a sixth line are output. Then, the same process is repeated, and finally pixel signals for an L-3 th line are output. Then, pixel signals for an L-2 th line are output. Although FIG. 5 illustrates that L is a multiple of four for convenience, there is no inevitability that L is a multiple of four.

In the high speed mode shown in FIG. 5, the actual number of lines from which pixel signals are read is half of the all of the lines. Therefore, the number of horizontal transfer operations is one-half of that required in the high quality image mode shown in FIG. 3. Thus, pixel signals are read in substantially one-half time. That is, pixel signals for one image can be obtained in 1/30 second. Therefore, an image can be obtained at a frame rate of 30 frames/second. The frequency frame rate is a value with which usual display of dynamic image can be realized.

In the high speed mode shown in FIG. 5, pixel signals for two lines are read at intervals of three lines to the color filter having the Bayer configuration. That is, pixel signals for two lines are read at intervals of four lines in the vertical direction. Therefore, the read pixel signals, that is, the right-hand columns shown in FIG. 5 are in the form of color line-sequential in which lines (CR) including red color information and lines (CB) including blue color information are alternately positioned in the vertical direction. Therefore, a high resolution image can be obtained.

In the high speed mode shown in FIG. 5, pixel signals for the first line and the second line are read at intervals of four lines in the vertical direction. Therefore, read pixel signals include color information of the line. Thus, an image free from considerable moire can be obtained.

Although pixel signals for two lines are, in the high speed mode shown in FIG. 5, read at intervals of four lines in the vertical direction, the number of lines is not limited to the foregoing number. For example, pixel signals for two lines may be read at intervals of 6 lines in the vertical direction. As an alternative to this, pixel signals for four lines may be read at intervals of 8 lines.

Also in the case where pixel signals for two lines are read at the intervals of four lines in the vertical direction, the lines to be read is not limited to the first and second lines. The lines may be the second line and a third line, or a third line and a fourth line or the first line and the fourth line.

In view of the foregoing, the second high speed mode described with reference to FIG. 5 is a mode in which pixel signals for n lines are read at intervals of m lines in the vertical direction (where m and n are natural numbers satisfying m>n). Specifically, the mode is a mode in which pixel signals for 2β lines are read at intervals of 2α lines in the vertical direction (where a and D are natural numbers satisfying α>β).

In other words, the lines of the CCD image sensor are divided into a plurality of blocks in the vertical direction, each of the blocks including m lines, and the pixel signals for n lines are read from the each block. Specifically, the pixel signals for the 2β lines are read from the each block consisting of the 2α lines.

In this case, time required to read pixel signals is substantially β/α of time required to perform reading in the high quality image mode.

Specifically, it can be said that 2β lines are composed of adjacent lines or lines obtained by reducing even-numbered lines. In this case, pixel signals are read by the color line-sequential manner to the Bayer configuration color filter. The pixel signals to be read include color information of adjacent lines.

Figure 6:
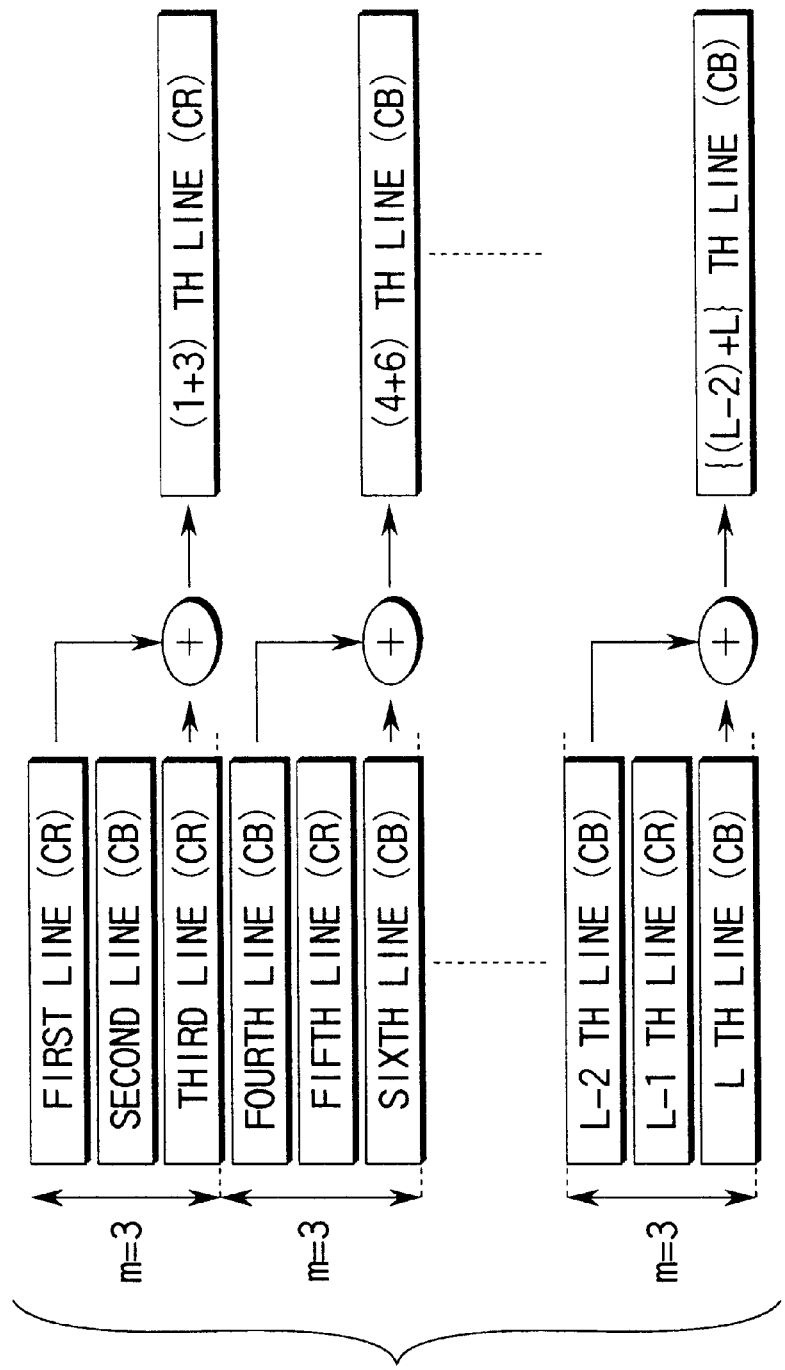
FIG. 6 shows a state where pixel signals are read in a third high speed mode.

FIG. 6 illustrates a state where pixel signals are read by a third high speed mode. The meanings of the drawing and expressions of CR and CB are the same as those shown in FIG. 4.

As shown in FIG. 6, the foregoing high speed mode is arranged in such a manner that the CCD image sensor 12 adds and outputs pixel signals for two lines at intervals of three lines in the vertical direction. That is, pixel signals for a first line and pixel signals for a third line are initially added and output. Then, pixel signals for a fourth line and pixel signals for a sixth line are added and output. Then, the same process is repeated, and finally pixel signals for the L-2 th line and pixel signals for an L th line are added and output. Although FIG. 6 illustrates that L is a multiple of 3 for convenience, there is no inevitability that L is a multiple of 3.

In the high speed mode shown in FIG. 6, the actual number of read lines is one-third of all of the lines. Therefore, the number of horizontal transfer operations is one-third of that required in the high quality image mode shown in FIG. 3. Thus, the pixel signals can substantially be read in one-third time. Therefore, pixel signals for one image can be obtained in 1/45 to 1/30 second. The foregoing frame rate is a value with which usual display of dynamic image can be realized.

In the high speed mode shown in FIG. 6, pixel signals for two lines are added and read at intervals of three lines in the vertical direction to the Bayer configuration color filter. Therefore, read pixel signals are in the form of color line-sequential configuration in which lines (CR) including red information and lines (CB) including blue information are positioned alternately in the vertical direction. Therefore, a high resolution image can be obtained.

Since pixel signals for the uppermost line at intervals of three lines in the vertical direction and pixel signals for the lowermost line at the same are added and read in the high speed mode shown in FIG. 6, read pixel signals include color information of adjacent lines. Therefore, an image free from considerable moiré can be obtained.

Addition of the pixel signals is performed in vertical transfer passages or a horizontal transfer passage. The addition in the vertical transfer passages will now be described, and then the addition in the horizontal transfer passage will be described.

Figure 7:
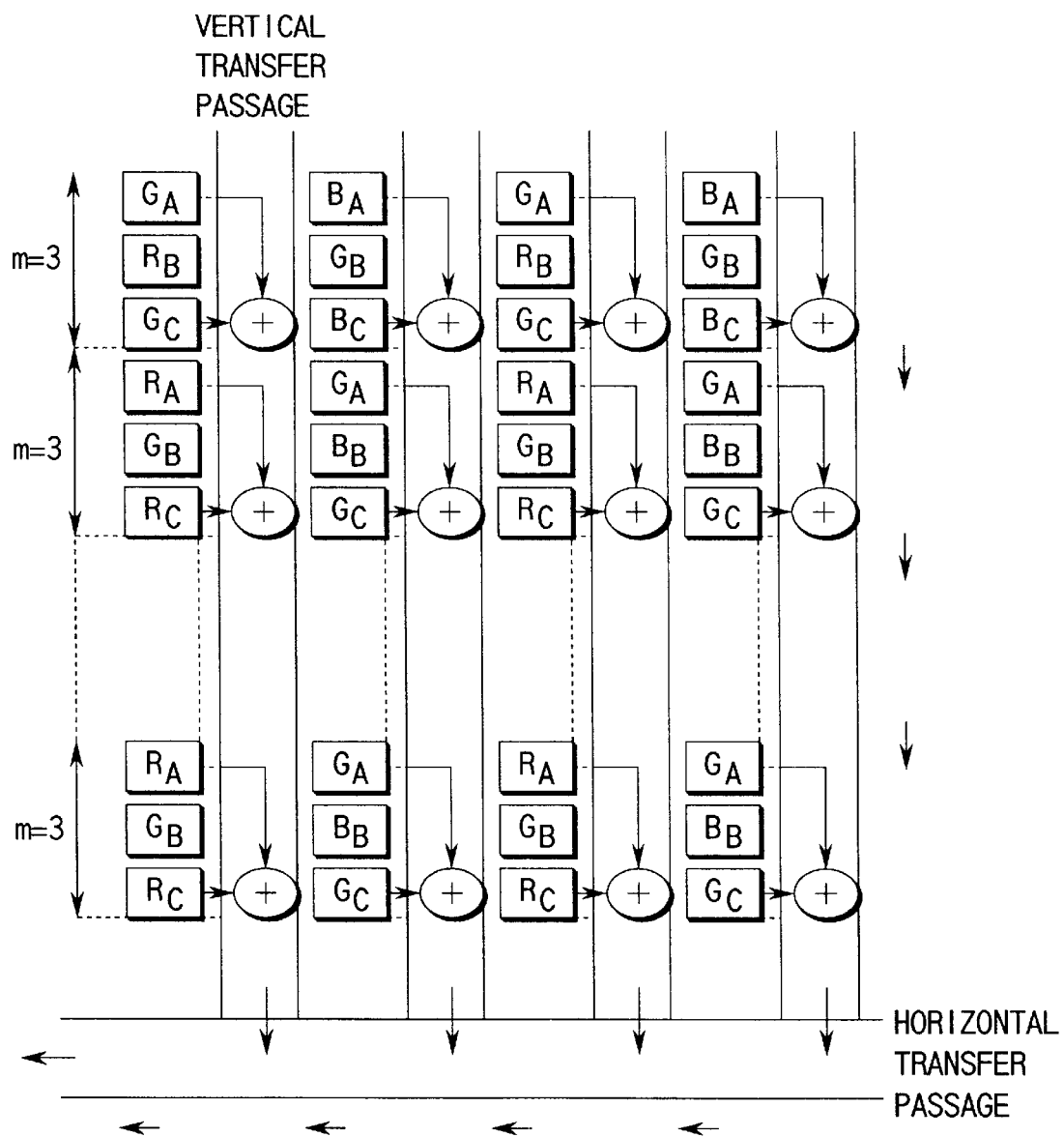
FIG. 7 shows addition of pixel signals in a vertical transfer passage relating to the mode shown in FIG. 6.

FIG. 7 illustrates addition of pixel signals in the vertical transfer passages. Referring to FIG. 7, each square indicates a photodiode which is each pixel of the CCD image sensor. Characters R, G and B of the alphabet indicate colors which are respectively recognized by the photodiode. The photodiodes positioned at relatively the same positions when the photodiodes are divided into three lines in the vertical direction are given one of subscripts A, B and C corresponding to the uppermost line, the central line and the lowermost line and added to any one of the characters R. G and B of the alphabet indicating the colors.

In other words, the photodiodes are divided into a plurality of blocks in the vertical direction, each of which includes three lines. In the every blocks, the photodiodes in the uppermost line are represented by one of the alphabetic characters R, G and B with the subscript A, the photodiodes in the central line are represented by one of the alphabetic characters R, G and B with the subscript B, and the photodiodes in the lowermost line are represented by one of the alphabetic characters R, G and B with the subscript C.

Addition of the pixel signals on the uppermost line (photodiodes each of which is indicated by the letter of the alphabet having the subscript A) and the pixel signals on the lowermost line (photodiode each of which is indicated by the letter of the alphabet having the subscript C) is performed, for example, as follows: as shown in FIG. 7, initially, the pixel signals from the photodiodes indicated by the letter of the alphabet having the subscript A are shifted to a vertical transfer passage, and then the charges, which are the pixel signals, are stored in potential wells formed in the vertical transfer passages by the side of the photodiodes in the uppermost line. Then, the potential wells having the charge of the pixel signals are downwards shifted through the vertical transfer passages. Simultaneously with shift of the charges to the side of the photodiodes positioned downwards by two lines, that is, the photodiodes indicated by the letter of the alphabet having the subscript C, the pixel signals of the lowermost line photodiodes, that is, the photodiodes indicated by the letter of the alphabet having the subscript C are shifted to the vertical transfer passages. As a result, the charges shifted from the photodiodes indicated by the letter of the alphabet having the subscript A and those shifted from the photodiodes indicated by the letter of the alphabet having the subscript C are collectively stored in the potential wells (indicated with an ellipse surrounding +shown in the drawing). That is, the pixel signals of the uppermost line photodiodes and the pixel signals of the lowermost line photodiodes are added to each other. Then, the potential wells in which the added pixel signals are stored, are continuously moved on the vertical transfer passages in the downward direction to reach the horizontal transfer passage, and then shifted to the left so as to sequentially be read in line units.

The size of the potential wells may be the same as that of the potential wells which are used when all of the pixels are read, or may be different from therefrom.

If the size of the potential wells is the same as that of the potential wells which are used when all of the pixel signals are read, that is, if the capacity of the potential wells are the same as the capacity of the photodiodes when all of the pixels are read, the capacity of the photodiodes is preferably adjusted to one-half of the capacity of the potential wells by changing the overflow drain substrate voltage. In other words, the photodiodes are preferably operated with a dynamic range which is one half of that when all of the pixels are read. The foregoing change in the capacity, that is, the dynamic range prevents the charges from overflowing the vertical transfer passages after addition has been performed. Although the dynamic range of the photodiodes is limited to one-half, the following signal processing operation can be performed without any problem because the signal level after reading is the same as that when all pixels are read.

If the size of the potential wells is different from that of the potential wells which are used when all of the pixel signals are read, the size of the potential wells are preferably two times that of the potential wells which are used when all pixels are read if the photodiodes are operated without change in the dynamic range. The foregoing setting of the potential wells prevents charges from overflowing the vertical transfer passages after the addition. In this case, there is a merit in terms of the SN ratio because the dynamic range of the photodiodes can be fully used.

Figure 8:
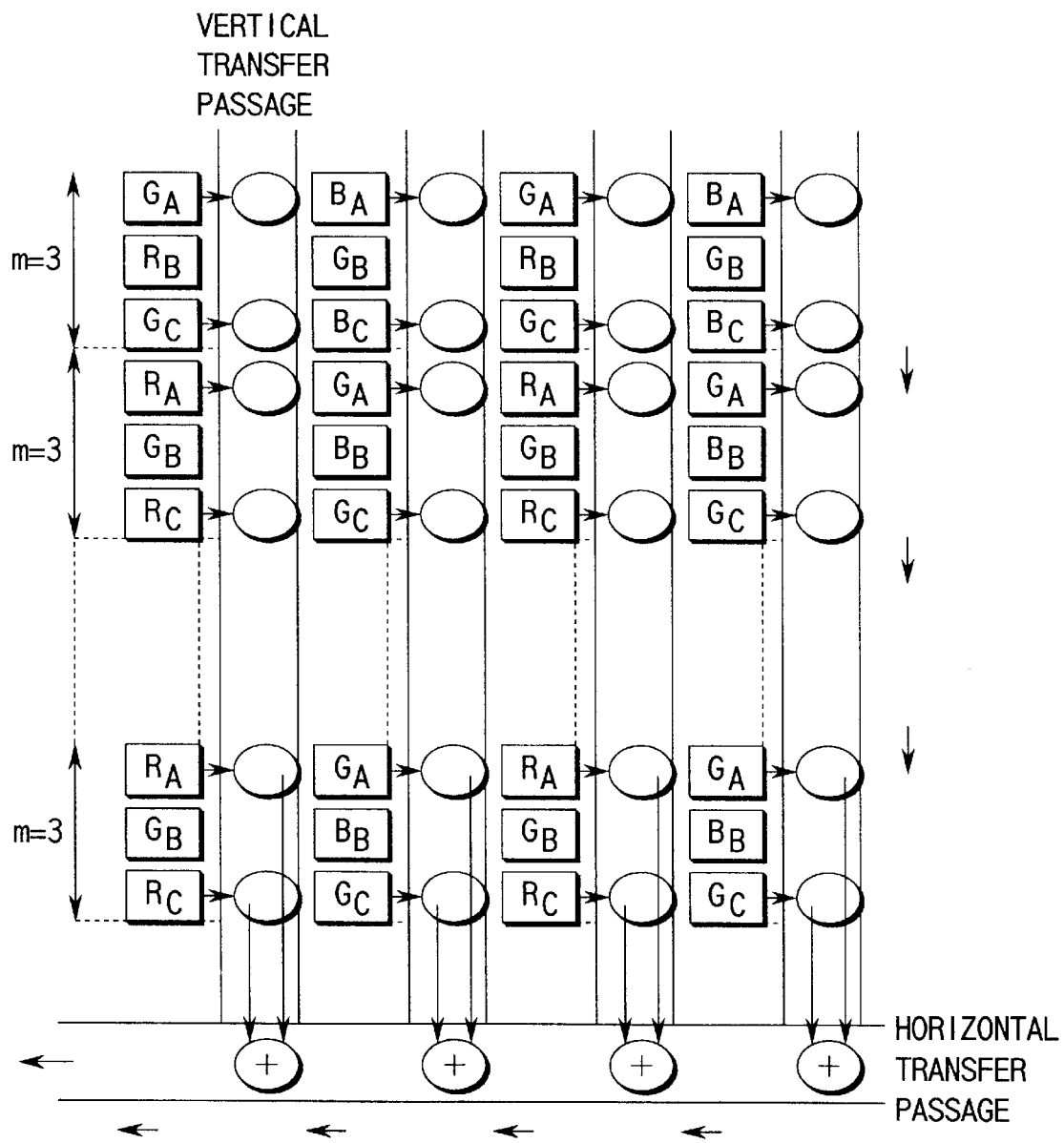
FIG. 8 shows addition of pixel signals in a horizontal transfer passage relating to the mode shown in FIG. 6.

FIG. 8 illustrates addition of pixel signals in the horizontal transfer passage. The meanings of square and letters in the alphabet in the drawings are the same as those shown in FIG. 7.

The pixel signals on the uppermost line and pixel signals on the lowermost line are added as follows. Referring to FIG. 8, pixel signals of photodiodes indicated by the letter of the alphabet having the subscript A and pixel signals of the photodiodes indicated by the letter of the alphabet having the subscript C are collectively shifted to the vertical transfer passage so that charges which are the pixel signals are stored in potential wells (each of which is indicated by a white ellipse) formed on the side of each photodiode. Then, all of the potential wells are uniformly moved downwards on the vertical transfer passages. Even after the charges stored in the potential wells in the lowermost line divided into three lines have been shifted to the potential wells (each of which is indicated by an ellipse surrounding +as shown in the drawing), downward shift of the potential wells for only two lines is continued. Also the charges stored in the potential wells on the uppermost line divided into three lines are shifted to the potential well formed on the horizontal transfer passage. As a result, the charges shifted from the photodiodes indicated by the letter of the alphabet having the subscript A and the charges shifted from the photodiodes indicated by the letter of the alphabet having the subscript C are stored in the potential wells on the horizontal transfer passage. That is, the pixel signals of the photodiodes on the uppermost line and the pixel signals of the photodiodes on the lowermost line are added. Then, the potential wells on the horizontal transfer passage are shifted to the left so as to sequentially be read in line units.

Since the horizontal transfer passage is formed on the outside of the image forming region differently from the vertical transfer passages extending between photodiodes, the potential wells formed on the horizontal transfer passage can have a capacity twice as large as that of the potential wells on the vertical transfer passages. Since the horizontal transfer passage is able to have potential wells each having a large capacity as described above, there is no possibility that charges overflow the horizontal transfer passage even if the photodiodes are operated with full dynamic ranges. In the foregoing case, there is a merit in terms of SN ratio because the dynamic range of the photodiodes can be fully used.

Although the high speed mode shown in FIG. 6 is arranged in such a manner that pixel signals for two lines are read at intervals of three lines in the vertical direction, the number of lines is not limited to the foregoing number. For example, pixel signals for two lines may be added and read at intervals of five lines in the vertical direction. As an alternative to this, pixel signals for two or three lines may be added and read at intervals of seven lines.

In view of the foregoing, the third high speed mode described with reference to FIG. 6 is a mode in which pixel signals for n lines at intervals of m lines in the vertical direction are added and read (where m and n are natural numbers satisfying m>n). Specifically, the foregoing mode is a mode for adding and reading pixel signals for 0 lines at intervals of $(2\beta-1)$ lines in the vertical direction (where $\alpha$ and $\beta$ are natural numbers satisfying $2\alpha-1>\beta>1$).

In other words, the lines of the CCD image sensor are divided into a plurality of blocks in the vertical direction, each of the blocks including m lines, and the pixel signals for n lines are read and added for the each block. Specifically, the pixel signals for the $\beta$ lines are read and added for the each block consisting of the $(2\beta-1)$ lines.

In this case, time required to read pixel signals is substantially n/m, that is, $\beta/(2\alpha-1)$ of time required to perform reading in the high quality image mode.

Specifically, the $\beta$ lines include at least each of the uppermost and lowermost lines at intervals of the $(2\beta-1)$ lines. That is, the $\beta$ lines include the uppermost and lowermost lines of the each block. In this case, read pixel signals include color information of adjacent lines.

More specifically, the D lines is composed of odd-numbered lines including each of the uppermost and lowermost lines at intervals of the $(2\beta-1)$ lines. That is, the $\beta$ lines consist of the odd-numbered lines including the uppermost and lowermost lines of the each block. In this case, pixel signals are read by the color line-sequential manner to the Bayer configuration color filter.

The addition described with reference to FIG. 7 is addition in which shift of charges for n lines to the vertical transfer passage is divided into n times and vertical transfer is performed by m−1 times so that addition of n lines is performed in the vertical transfer passage, and then vertical transfer clocks are supplied in units of m times to perform transfer to the horizontal transfer passage.

The addition described with reference to FIG. 8 is arranged in which charges for n lines are shifted to the vertical transfer passage and vertical transfer clocks are supplied in units of m times to perform transfer to the horizontal transfer passage so that addition of n lines is performed in the horizontal transfer passage.

Figure 9:
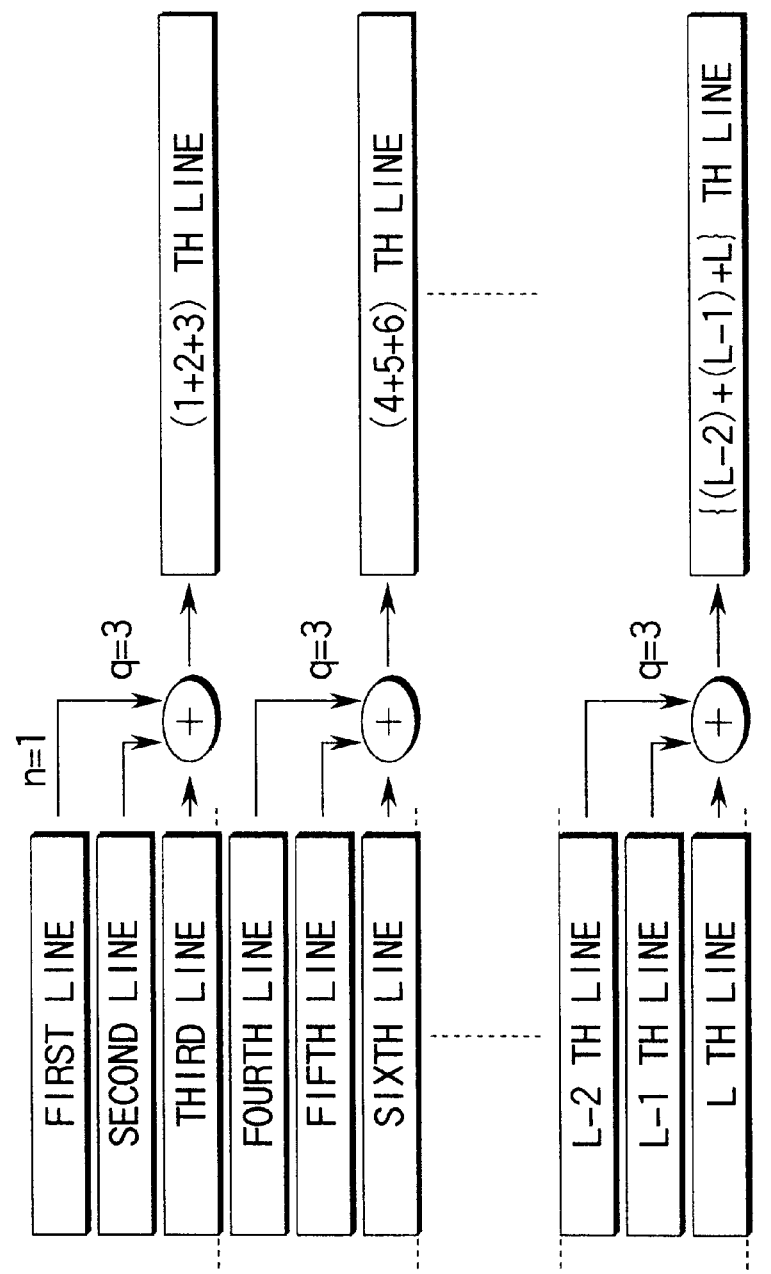
FIG. 9 shows a state where pixel signals are read in a fourth high speed mode.

FIG. 9 illustrates a state where pixel signals are read in a fourth high speed mode. The meanings of the drawings and expressions CR and CB are the same as those shown in FIG. 4.

As shown in FIG. 9, the foregoing high speed mode is arranged in such a manner that the CCD image sensor 12 adds and outputs pixel signal for three lines consecutive in the vertical direction. That is, pixel signals for the first line, pixel signals for the second line and pixel signals for the third line are initially added and output. Then, pixel signals frequency the fourth line, pixel signals for the fifth line and pixel signals for the sixth line are added and output. Then, the same process is repeated, and finally pixel signals for the L-2 th line, pixel signals for the L-1 th line and pixel signals for the L th line are added and output. Although FIG. 9 illustrates that L is a multiple of 3 for convenience, there is no inevitability that L is a multiple of 3.

In the high speed mode shown in FIG. 9, the number of lines which are actually read is one-third of all of the lines. Therefore, the number of horizontal transfer operations is one-third of the number in the high quality image mode shown in FIG. 3. Thus, pixel signals are substantially read in one-third times. Therefore, pixel signals for one image can be obtained in 1/45 to 1/30 second. Therefore, an image can be obtained in a frame rate of 30 to 45 frames/second. The foregoing frame rate is a value with which a usual display of dynamic image can be realized.

Addition of the pixel signals are performed in the vertical transfer passages or the horizontal transfer passage. The addition in the vertical transfer passages will be first described. Then, the addition in the horizontal transfer passage will be described.

Figure 10:
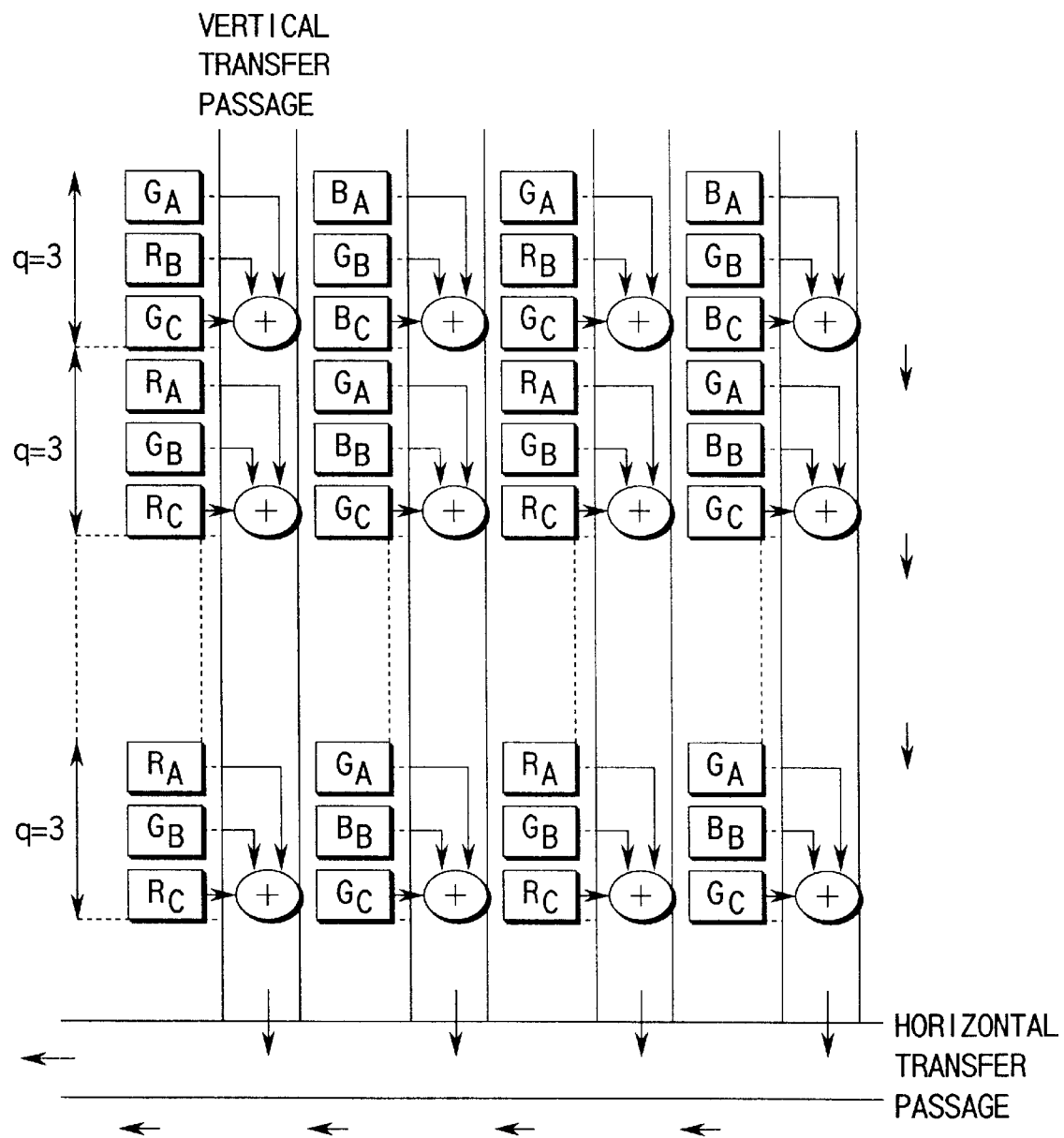
FIG. 10 shows addition of pixel signals in the vertical transfer passage relating to the mode shown in FIG. 9.

FIG. 10 illustrate the addition of pixel signals in the vertical transfer passages. The meanings of the square and alphabet are the same as those shown in FIG. 7.

The addition of pixel signals is performed, for example, as follows. Referring to FIG. 10, pixel signals of photodiodes indicated by the letter of the alphabet having the subscript A are initially shifted to the vertical transfer passages so that charges, which are pixel signals, are stored in the potential wells formed on the sides of the photodiodes. Then, the potential wells in which charges of the pixel signals of the photodiodes on the uppermost line are downwards moved through the vertical transfer passages. Simultaneously with shift of the charges to the photodiodes positioned downwards by one line, that is, the photodiodes indicated by the letter of the alphabet having the subscript B, pixel signals of photodiodes of a next line, that is, photodiodes indicated by the letter of the alphabet having the subscript B are shifted to the vertical transfer passages. As a result, charges shifted from the photodiodes indicated by the letter of the alphabet having the subscript A and charges shifted from the photodiodes indicated by the letter of the alphabet having the subscript B are collectively stored in the potential wells. Then, the potential wells in which charges of the pixel signals of the uppermost line and the next line are continuously moved downwards on the vertical transfer passages. Simultaneously with shift of the charges to the sides of the photodiodes positioned downwards by one line, that is, photodiodes indicated by the letter of the alphabet having the subscript C, pixel signals of the photodiodes of the lowermost line, that is, the photodiodes indicated by the letter of the alphabet having the subscript C are shifted to the vertical transfer passages. As a result, the charges shifted from the photodiodes indicated by the letter of the alphabet having the subscript A, the charges shifted from the photodiodes indicated by the letter of the alphabet having the subscript B and the charges shifted from the photodiodes indicated by the letter of the alphabet having the subscript C are collectively stored in the potential wells (indicated by ellipses each surrounding +shown in the drawing). That is, the pixel signals of the photodiodes on the uppermost line, the pixel signals of the photodiodes on the second line and the pixel signals of the photodiodes on the lower-most line are added. Then, the potential wells, in which the added pixel signals are stored, are continuously moved downwards on the vertical transfer passages. After the added pixel signals have been shifted to the horizontal transfer passage, they are shifted to the left so as to sequentially be read in line units.

The size of the potential wells may be the same as that of the potential wells which is used when all of the pixels are read, or may be different from therefrom.

If the size of the potential wells is the same as that of the potential wells which are used when all of the pixel signals are read, that is, if the capacity of the potential wells is the same as the capacity of the photodiodes when all of the pixels are read, the capacity of the photodiodes is preferably adjusted to one-third of the capacity of the potential wells by changing the overflow drain substrate voltage. In other words, the photodiodes are preferably operated with a dynamic range which is one-third of that when all of the pixels are read. The foregoing change in the capacity, that is, the dynamic range prevents the charges from overflowing the vertical transfer passages after addition has been performed. Although the dynamic range of the photodiodes is limited to one-third, the following signal processing operation can be performed without any problem because the signal level after reading is the same as that when all pixels are read.

If the size of the potential wells is different from that of the potential wells which are used when all of the pixel signals are read, the size of the potential well is preferably three times that of the potential wells which are used when all pixels are read if the photodiodes are operated without change in the dynamic range. The foregoing setting of the potential wells prevents charges from overflowing the vertical transfer passages after the addition. In this case, there is a merit in terms of the SN ratio because the dynamic range of the photodiodes can be fully used.

Figure 11:
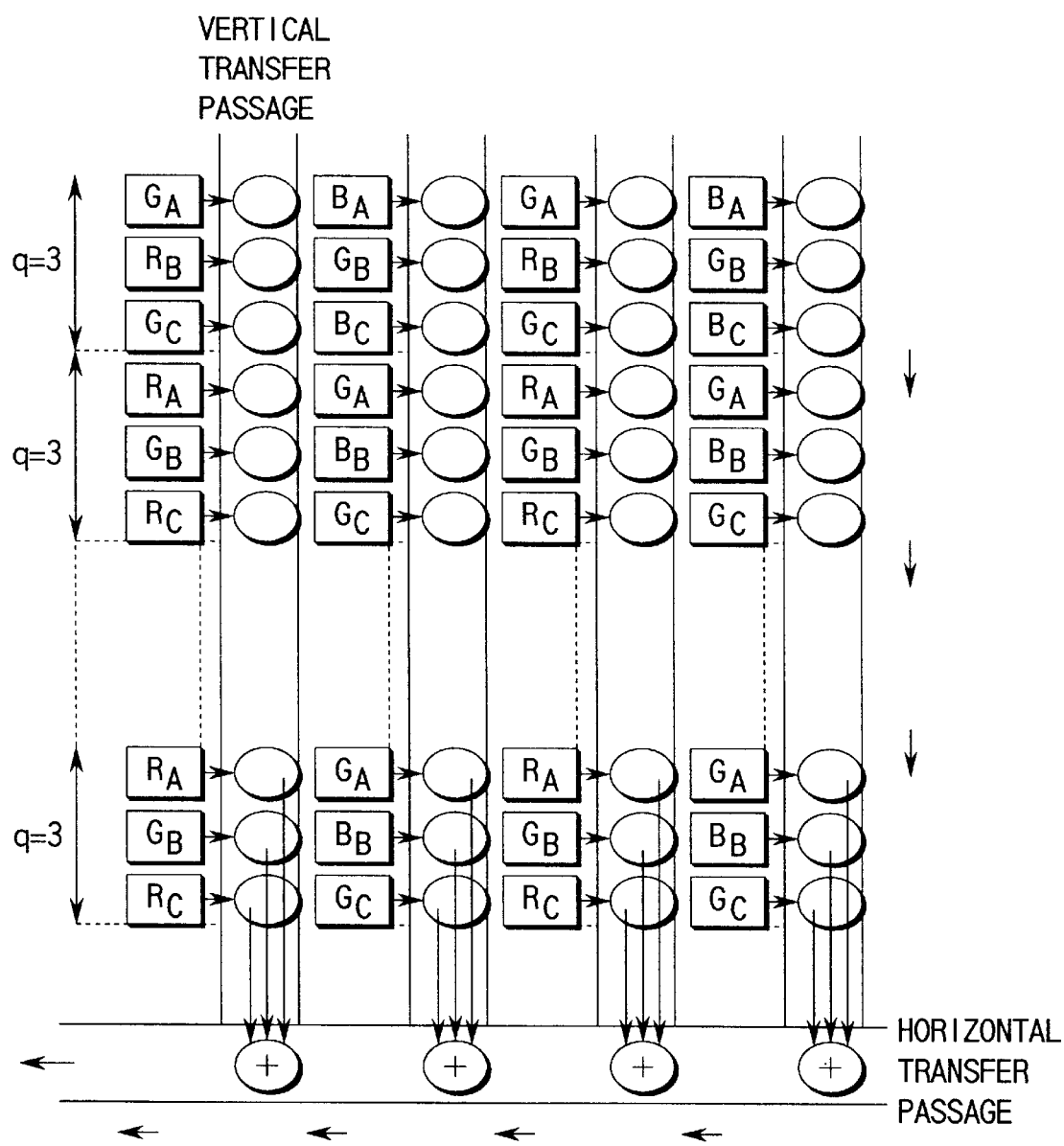
FIG. 11 shows addition of pixel signals in the horizontal transfer passage relating to the mode shown in FIG. 9.

FIG. 11 shows addition of pixel signals in the horizontal transfer passage. The meanings of the square and alphabet are the same as those shown in FIG. 7.

Addition of the pixel signals is performed as follows: referring to FIG. 11, pixel signals of photodiodes indicated by the letter of the alphabet having the subscript A, pixel signals of photodiodes indicated by the letter of the alphabet having the subscript B and pixel signals of photodiodes indicated by the letter of the alphabet having the subscript C are collectively shifted to the vertical transfer passage so that charges, which are the pixel signals, are stored in potential wells (indicated by white ellipses shown in the drawing) formed on the sides of the photodiodes. Then, all of the potential wells are uniformly moved downwards on the vertical transfer passage. Even after the charges stored in the potential wells of the lowermost line divided every three lines have been shifted to the potential wells (each of which is indicated by an ellipse surrounding +) formed in the horizontal transfer passage, the downward movement of the potential wells for only the two lines is continued. Also the charges stored in the potential wells on the next line divided every three lines and charges stored in the potential wells on the uppermost are shifted to the potential wells formed on the horizontal transfer passage. As a result, the charges shifted from the photodiodes indicated by the letter of the alphabet having the subscript A, the charges shifted from the photodiodes indicated by the letter of the alphabet having the subscript B and the charges shifted from the photodiodes indicated by the letter of the alphabet having the subscript C are stored in the potential wells in the horizontal transfer passage. That is, pixel signal of the photodiodes of the three lines continued in the vertical direction are added. Then, the potential wells in the horizontal transfer passage are shifted to the left so as to sequentially be read in line units.

Since the horizontal transfer passage is positioned on the outside of the image forming region differently from the vertical transfer passage extending among the photodiodes, the width of the horizontal transfer passage can be enlarged. That is, the capacity of the horizontal transfer passage can be enlarged. Therefore, the capacity of the potential wells, which are formed in the horizontal transfer passage, can be enlarged to three or more times the capacity of the potential wells in the vertical transfer passages. Since the large-capacity potential wells can be formed in the horizontal transfer passage, there is no possibility that charges overflow the horizontal transfer passage. In this case, there is a merit in terms of SN ratio because the dynamic range of the photodiode can fully be used.

In the high speed mode shown in FIG. 9, pixel signal for three lines continued in the vertical direction are added and read. However, the number of lines is not limited to the foregoing number. For example, pixel signals for four or five lines continued in the vertical direction may be added and read.

When pixel signals for even-numbered lines in the vertical direction are added and read, the pixel signals read to the Bayer configuration color filter include R+2G+B color information items. The foregoing value is close to the structure of a brightness signal and thus information of contrast can easily be obtained. Therefore, it is suitable for data for controlling automatic focusing.

In view of the foregoing, the fourth high speed mode described with reference to FIG. 9 is a mode in which pixel signal for q lines continued in the vertical direction (where q is a natural number).

The addition described with reference to FIG. 10 is addition in which shift of charges for q lines to the vertical transfer passage is divided into q times and vertical transfer is performed q–1 times to addition of n lines is performed in the vertical transfer passage after which vertical transfer clocks are supplied in units of q times to perform transfer to the horizontal transfer passage.

The addition described with reference to FIG. 11 is addition in which charges for q lines is shifted to the vertical transfer passage, after which vertical transfer clocks are supplied in units of q times to perform transfer to the horizontal transfer passage so that addition of q lines is performed in the horizontal transfer passage.

As described above, the CCD image sensor 12 is, in a usual state, operated in the high speed mode and operated in the high quality image mode only when the trigger 46 is depressed to record a fine image on the recording medium 32. As shown in, for example, FIG. 12, the liquid crystal display portion 34 displays one image at each frame, that is, every 1/60 second. Immediately after the trigger 46 has been depressed, one image is displayed for time corresponding to six frames, that is, in 1/10 second. Display of one image in 1/60 second, that is, display of an image at a frame rate of 60 frames/second can be recognized for the eyes of a human being as a dynamic image. Therefore, an image obtainable in the high speed mode is expressed as a "dynamic image", while an image obtainable in the high quality image mode is expressed as a "still image" so as to be distinguished from the dynamic image. In relation to this, an image obtainable in the high speed mode is sometimes expressed as a "dynamic image" and an image obtainable from the high quality image mode is sometimes expressed as a "still image" in the following description.

Since time (1/10 second in the structure shown in FIG. 12) corresponding to a plurality of frames is required to read a still image, the still image is displayed on the liquid crystal display portion 34 for a certain period after the trigger has been depressed. During this, the still image is recorded on the recording medium 32. After the still image has been recorded, the reading mode of the CCD image sensor 12 is again switched to the high speed mode so that a dynamic is again displayed on the liquid crystal display portion 34.

The electronic imaging apparatus according to this embodiment obtains control data for an automatic focusing mechanism (AF), an automatic white balance adjustment mechanism (AWB) and an automatic exposure adjustment mechanism (AE) every frame, that is, every 1/60 second. Control data for AF, AWB and AE is obtained by the CPU 24 in accordance with image data temporarily stored in the DRAM 28 in the mode in which a partial image is read. That is, the CPU 24 extracts image data temporarily stored in the DRAM 28 at every frame, that is, every 1/60 second to subject image data to a proper calculation process to calculate data for any one of AF, AWB and AE. Control for AF, AWB and AE is sequentially calculated for each frame, and calculations of control data is repeatedly performed during display of a dynamic image.

Calculated control data for AF is supplied to the lens drive system 38 so that the lens drive system 38 shift the lens 40 in the direction of optical axis in accordance with supplied control data. Control data for AE is supplied to the stop control system 42 so that the stop control system 42 adjusts the aperture diameter of the stop 44 in accordance with the supplied control data. Control data for AWB is supplied to the image processing portion 26 so as to be used to correct the hue of the image.

Since control data for AF, AWB and AE is obtained at each frame, the DRAM 28 for temporarily storing image data may be employed as an electric circuit for obtaining control data. Although the conventional apparatus arranged to simultaneously obtain control data for AF, AWB and AE requires three systems of exclusive circuits, the apparatus according to this embodiment is not need to have the foregoing circuits.

Figure 14:
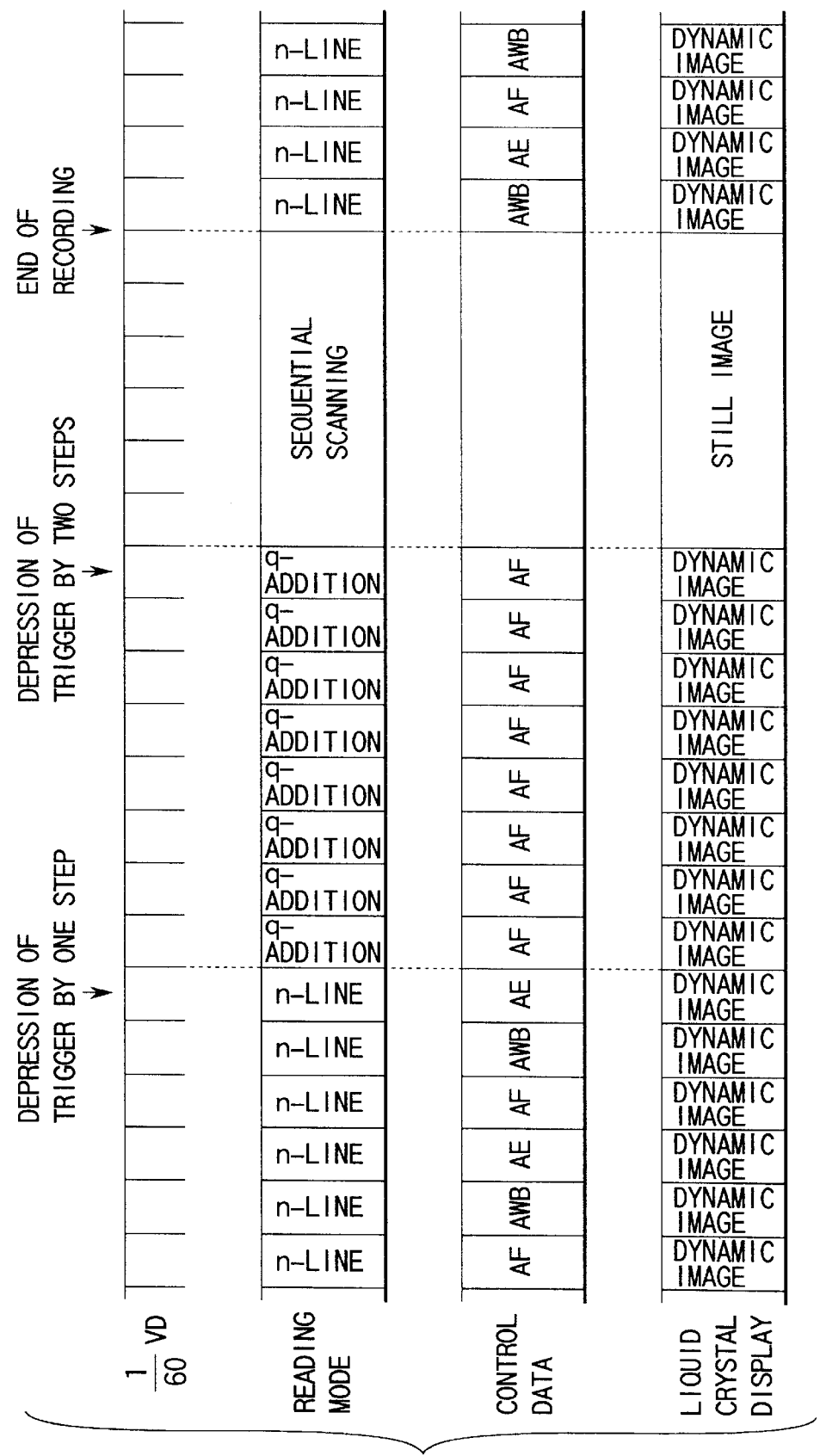
FIG. 14 shows an example of switching of a reading mode in accordance with the operation of a trigger.

The high speed mode for displaying a dynamic image may be switched in the above-mentioned four modes. Moreover, a manner of calculating control data may be switched as the mode is switched. The reading mode is switched during display of a dynamic image is performed by, for example, operating the trigger. In this case, the trigger 46 is a two-step depression type trigger which acts as a first switch when the trigger is depressed by one step and acts as a second switch when the trigger is depressed by two steps after that. FIG. 14 illustrates an example of switch of the reading mode in accordance with the operation of the trigger.

In a usual state, the CCD image sensor 12 is operated in any one of the first, second and third high speed modes. FIG. 14 illustrates the foregoing high speed modes as "n-line" mode. During this, control data for AF, AWB and AE is repeatedly calculated for each frame in accordance with image data obtained from the n-line mode so that AF control, AWB control and AE control are performed.

In a certain time after the trigger 46 has been depressed by one step, the CCD image sensor 12 is operated in the fourth high speed mode. FIG. 14 illustrates the foregoing high speed mode as a "q-addition" mode. During this, control for the AF is calculated for each frame in accordance with image data obtained in the q-addition mode so that only AF control is performed. That is, a predetermined time after the trigger has been depressed by one step is assigned to only AF control. Since pixel signals read in the q-addition mode include R+2G+B color information items and close to the structure of the brightness signal as described above, contrast information can easily be obtained and it is suitable for use in calculating control data for the AF. Therefore, the AF control using the optimal control data is performed in the foregoing period.

When the trigger 46 is depressed by two steps, the CCD image sensor 12 is switched to the reading mode immediately in the case of that a predetermined time for only the AF control has elapsed or after the predetermined time pass in the case of that the predetermined time has not been elapsed so as to be operated in the high quality image mode by the sequential scanning manner. Then, a fine image obtained by the sequential scanning operation is recorded on the recording medium 32 in 6 frames, that is, 1/10 second. After the still image has been recorded, the reading mode of the CCD image sensor 12 is returned to the n-line mode.

Since only the AF control is performed in accordance with optimal control data because of the switch of the reading mode and change of the control data, a further focused fine image can efficiently be obtained.

Figure 15:
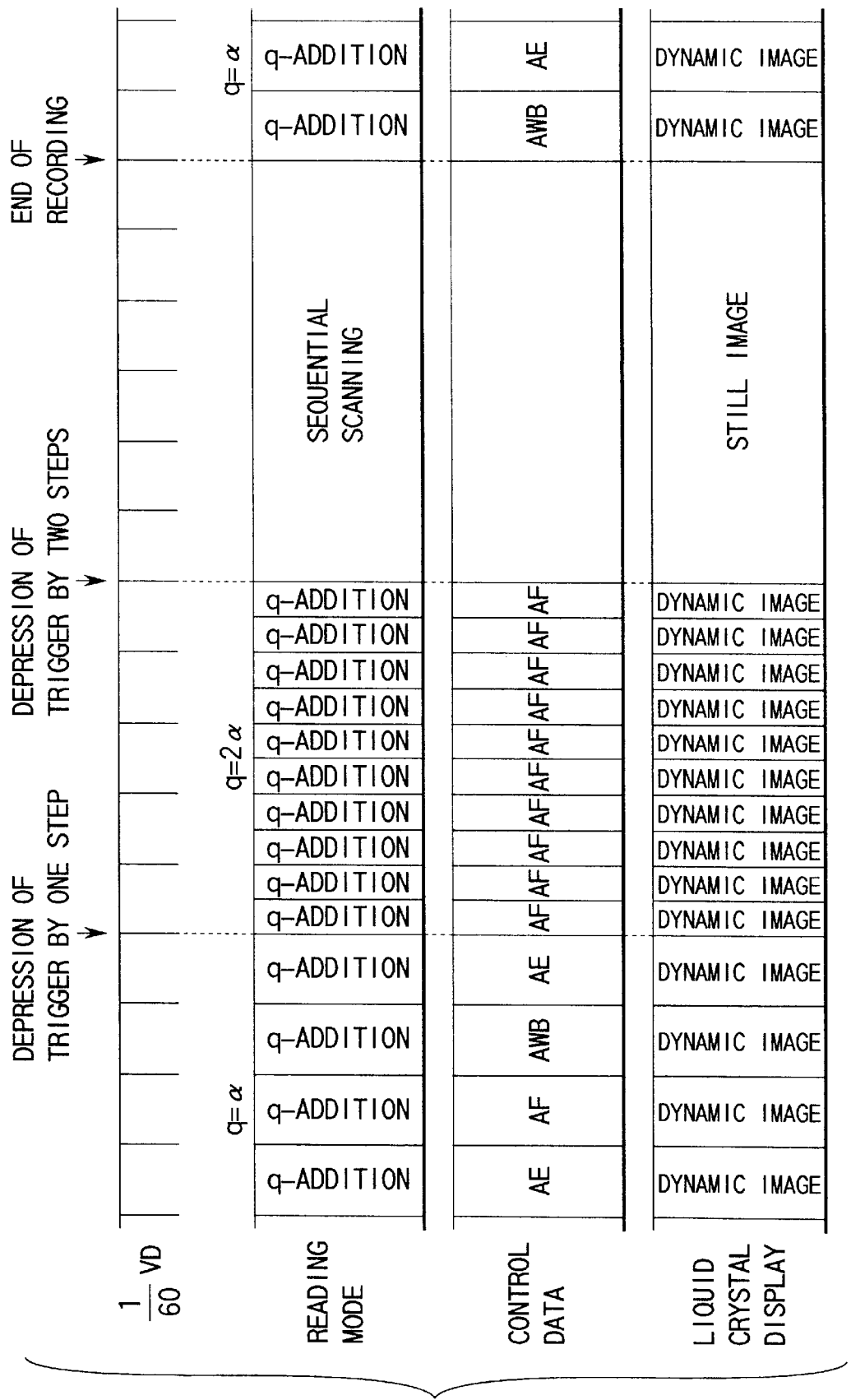
FIG. 15 shows another example of switching of the reading mode in accordance with the operation of the trigger.

FIG. 15 illustrates another example of the switch of the reading mode which is performed in accordance with the operation of the trigger. In this example the CCD image sensor 12 is always operated in the q-addition mode except for the number of addition lines immediately before the still image is recorded is twice the number in the usual operation.

In a usual state, the CCD image sensor 12 is operated in the q-addition mode in which pixel signals for $\alpha$ lines ($\alpha$ is a natural number not smaller than 2) are added and read. During this, control data for AF, AWB and AE is repeatedly calculated at intervals of 1/60 second in accordance with image data obtained in the q-addition mode so that the AF control, the AWB control and the AE control are performed.

In a certain period after depression of the trigger 46 by one step, the CCD image sensor 12 is operated in the q-addition mode in which pixel signals for $2\alpha$ lines continued in the vertical direction are added and read. During this, control data for the AF is calculated at intervals of 1/120 second in accordance with image data obtained in the q-addition mode. In accordance with control data, the AF control is performed.

When the trigger 46 is depressed by two steps, reading mode of the CCD image sensor 12 is switched immediately in the case of that a predetermined time for only the AF control has elapsed or after the predetermined time pass in the case of that the predetermined time has not been elapsed so as to be operated in the high quality image mode by the sequential scanning manner. Then, a fine image obtained by the sequential scanning operation is recorded on the recording medium 32 in 6 frames, that is, 1/10 second. After the still image has been recorded, the reading mode of the CCD image sensor 12 is returned to the q-addition mode for a usual state.

Since only the AF control is performed in accordance with control data which can be obtained at a rate which is twice the rate in a usual state because of switch of the reading mode and change of control data, a fine image focused more quickly can efficiently be obtained at an optimal shutter release opportunity.

As easily understood from the above description, the CCD image sensor is, when no photographing operation is performed, operated in a high speed mode in which, for example, pixel signals for n lines are read at intervals of m lines in the vertical direction. As a result, an electronic imaging apparatus can be obtained which has a 1,000,000 pixel class CCD image sensor which displays an image which can be recognized as dynamic images when no photographing operation is performed even with an operation frame rate is not higher than 20 MHz.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic imaging apparatus comprising:
   a solid state imaging device;
   a multistep switch for switching an operation mode of the solid state imaging device, the operation mode including a first operation mode, a second operation mode which starts in response to a first stage of the multistep switch, and a third operation mode which starts in response to a second stage of the multistep switch;
   control means for extracting pixel signals from the solid state imaging device, wherein the control means: extracts pixel signals of the solid state imaging device adding n lines in units of m lines in a vertical direction (where n is a natural number and m>n) to display a dynamic image when the solid state imaging device is operated in the first operation mode, extracts pixel signals of the solid state imaging device adding q lines in units of q successive lines in the vertical direction (where q is a natural number) when the solid state imaging device is operated in the second operation mode, and extracts all pixel signals of the solid state imaging device by sequential scanning to record a still image when the solid state imaging device is operated in the third operation mode.

2. An electronic imaging apparatus according to claim 1, wherein the solid state imaging device includes a Bayer configuration color filter, and m=2$\alpha$−1 and n=$\beta$ (where $\alpha$ and $\beta$ are natural numbers and 2$\alpha$−1>$\beta$>1).

3. An electronic imaging apparatus according to claim 1, wherein when the solid state imaging device is operated in one of the first and second operation modes, an output signal from the solid state imaging device is used as one of AF information AE information and AWB information, and control data for one of AF, AE and AWB is repeatedly calculated in turn for each frame.

4. An electronic imaging apparatus according to claim 1, wherein when the solid state imaging device is operated in the second operation mode, an output signal from the solid state imaging device is used as AF information, and control data for AF is repeatedly calculated for each frame.

5. An electronic imaging apparatus comprising:
   a solid state imaging device;
   a multistep switch for switching an operation mode of the solid state imaging device, the operation mode including a first operation mode, a second operation mode which starts in response to a first stage of the multistep switch, and a third operation mode which starts in response to a second stage of the multistep switch;
   control means for extracting pixel signals from the solid state imaging device, wherein the control means: reads pixel signals of a part of lines in the solid state imaging device to repeatedly extract the pixel signals with a first rate to display a dynamic image when the solid state imaging device is operated in the first operation mode, reads pixel signals of a part of lines in the solid state imaging device to repeatedly extract the pixel signals with a second rate higher than the first rate when the solid state imaging device is operated in the second operation mode, and extracts all pixel signals of the solid state imaging device by sequential scanning to record a still image when the solid state imaging device is operated in the third operation mode.

6. An electronic imaging apparatus according to claims 5, wherein when the solid state imaging device is operated in one of the first and second operation modes, an output signal from the solid state imaging device is used as one of AF information, AE information and AWB information, and control data for one of AF, AE and AWB is repeatedly calculated in turn for each frame.

7. An electronic imaging apparatus according to claim 5, wherein when the solid state imaging device is operated in the second operation mode, an output signal from the solid state imaging device is used as AF information, and control data for A is repeatedly calculated for each frame.

* * * * *